Nov. 11, 1924.

J. KILCHAR

RAT TRAP

Filed April 4, 1922

1,514,770

Jacob Kilchar, INVENTOR.

BY Geo. F. Kimmel ATTORNEY.

Patented Nov. 11, 1924.

1,514,770

UNITED STATES PATENT OFFICE.

JACOB KILCHAR, OF WAYLAND, IOWA.

RAT TRAP.

Application filed April 4, 1922. Serial No. 549,483.

*To all whom it may concern:*

Be it known that I, JACOB KILCHAR, a citizen of the United States, residing at Wayland, in the county of Henry and State of Iowa, have invented certain new and useful Improvements in Rat Traps, of which the following is a specification.

This invention relates to a trap and more particularly to the class of devices, known as animal traps for use in catching mice, rats and other animals.

The primary object of the invention is the provision of a trap or device of this character, wherein the construction thereof is novel in form, so that animals to be trapped will be enticed into an enclosure and on entrance will be automatically dropped into a container for imprisonment or confinement, the container being of a construction to permit the catching and holding therein in succession, a number of such animals.

Another object of the invention is the provision of a trap or device of this character, wherein the mechanism thereof is automatic in its action, so that after the trapping of one or more animals for confinement therein, the trap mechanism thereof will automatically reset for the further working of the trap or device.

A still further object of the invention is the provision of a trap or device of this character, being simple in construction readily portable so that same can be placed at any desirable location, strong, durable, thoroughly reliable and efficient in its purpose and inexpensive to manufacture.

With these and other objects in view, the invention consists in the features of construction, combination and arrangement of parts, as will be hereinafter more fully described, illustrated in the accompanying drawings and pointed out in the claim hereunto appended.

Figure 1:
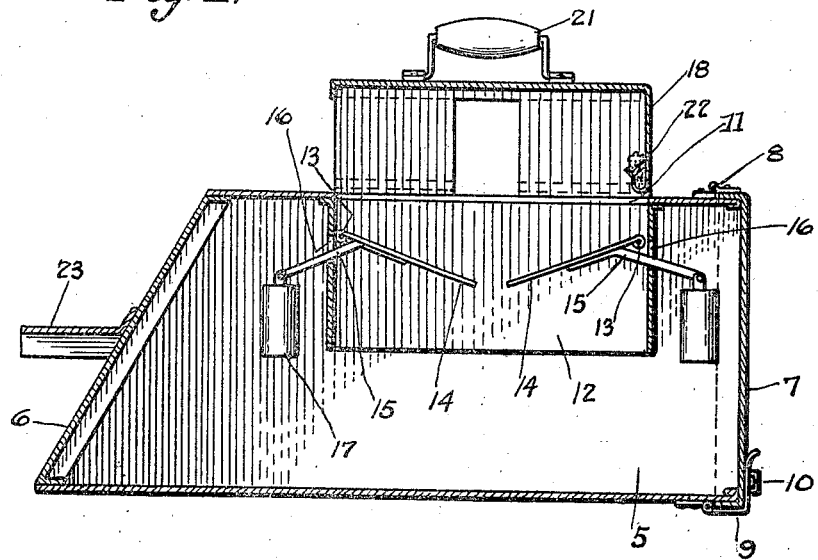
Figure 2:
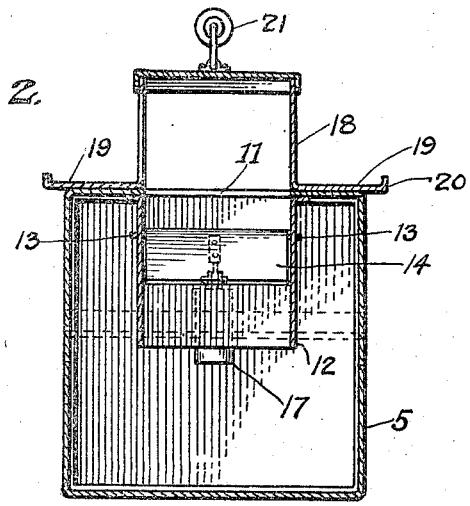

In the accompanying drawings, Fig. 1 is a vertical, longitudinal sectional view through a trap or device, constructed in accordance with the invention, Fig. 2 is a vertical transverse sectional view taken approximately medially of the trap.

Similar reference characters indicate corresponding parts throughout the several views in the drawings.

Referring to the drawings in detail, the trap or device comprises a main body 5 constituting a trapping compartment, preferably in the form of a rectangular box, in this instance made from sheet metal, although the same may be made from any other suitable material, and at one end is formed with an inclined wall 6, while its opposite end is opened and normally closed by means of a vertically swinging door 7, supported upon hinges 8 and held in closed position through the medium of a hasp 9 carried by the bottom of the body 5 which is adapted to detachably engage a keeper 10 carried by the door 7, said keeper being designed to receive a lock or other fastening element. On the opening of the door 7 free access can be had to the interior of the body 5 for the removal of animals confined therein.

Formed in the top of the body 5, longitudinally thereof and centrally of the same is a rectangular opening 11, while fastened in any suitable manner, marginally of said opening upon the inner face of the top and depending therefrom within the body 5 is a vertical chute 12, through which pass animals when precipitated through the opening 11 in the top of the body.

Near opposite ends of this chute, close to the opening 11 are journaled horizontal transversely disposed pintles 13 on which are hinged opposed dumping or tilting platforms 14, each being provided with a bar 15 formed of an inner and outer portion disposed at an inclination with respect to each other, the inner portion being of less length than the outer portion and secured to the lower face of the platform and the outer portion projecting through a slot 16 formed in the end wall and adjacent thereto of the chute 12, and having pivotally connected to the free end a pendant weight 17 which serves to normally hold the platform in position as is clearly shown in Fig. 1 of the drawing. These weights 17 will permit the said platforms to lower when the weight of an animal is imposed against the same and drop said animal into the body 5 for confinement therein. The weights 17 on the outer portion of the bar 15 supported by the platforms 14 are disposed outside the chute 12 within the body 5 at opposite ends thereof.

Rising from the top of the body 5 over the opening 11 therein is a bait tower 18, which is open at one end next to the inclined end wall 6 of the body 5 and at one side thereof, while extended laterally from said tower at its sides in super-imposed relation to the top of the body are ledges 19 having upturned or flanged edges 20. These ledges 19 are formed integral with the walls of the tower and constitute a treadway for animals enticed into the tower 18 to be trapped within the body 5.

The tower 18 is of the same length as the opening 11 in the top of the body 5. On its top cover is mounted a swing handle or hand-hold 21 to permit the convenient transportation by the hand of the trap or device.

Within the tower 18 at its closed end is formed a bait holder in the form of a trough 22 to accommodate suitable bait for enticing animals within said tower. This trough is formed across the rear of the tower by turning in and upwardly the lower edge of the end wall, and has its bottom in substantially the same plane as the top of said trap body.

On the inclined end wall 6 of the body 5 at a suitable height is a shelf 23 constituting a step for animals to permit the same to more readily ascend from the ground or foundation to the top of the body 5 on to the ledges 19 as will be clearly apparent.

It will be seen that when the bait is placed within the bait trough 22 and the trap or device is positioned upon the ground or foundation, animals will be attracted by such bait and on entering the tower 18, necessarily have to tread upon the platform 14 to gain access to the bait and when treading upon these platforms, the latter will lower with rapidity against the resistance of the weights 17 dropping the animal within the body 5 for confinement therein. The instant the weight of the animal is relieved from the platforms, the weights 17 cause the automatic closing of the platforms and thereby preventing the exit of such animal through the opening 11 in the top of the body 5 and thus the positive entrapping of the animal within the trap or device.

From the foregoing it is thought that the construction and manner of operation of the device or trap will be clearly understood, and, therefore, a more extended explanation has been omitted.

What is claimed is:—

A trap comprising a trapping compartment having its top formed with a rectangular opening, a rectangular chute depending in the compartment and registering with the opening, said chute having a vertical slot in the front and rear wall thereof, a pair of oppositely disposed platform members arranged within the chute, means for hinging one end of each of said members to the side walls of the chute in close proximity to and above one of the vertical slots, a pair of bars each formed of an inner and outer portion disposed at an inclination with respect to each other, the inner portion of each bar being of less length than the outer portion and secured to the lower face of one of said members, the outer portion extending through one of the vertical slots and projecting from the chute, and a weight pivotally suspended from the outer end of each outer portion.

March 25, 1922.

In testimony whereof, I affix my signature hereto.

JACOB KILCHAR.